2,980,741
DI-VALENT NICKEL ACETYLENE REACTIONS

Harold H. Zeiss and Minoru Tsutsui, Dayton, Ohio, assignors to Monsanto Chemical Company, St. Louis, Mo., a corporation of Delaware No Drawing. Filed July 8, 1959, Ser. No. 825,673

21 Claims. (Cl. 260—668)

The present invention is directed to the polymerization of di-substituted acetylenes in the presence of di-valent nickel hydrocarbon compounds.

The invention is particularly directed to the condensation of di-substituted acetylenes in the presence of dialkyl or diaryl nickel compounds to unsaturated rings, particularly 6-membered unsaturated rings, and is especially directed to such condensations to aromatic systems.

The invention is further directed to stabilized dialkyl and diaryl nickel compounds and methods of preparing same. The invention is further directed to 1,2,3,4-tetraphenyl-1,3-cyclohexadiene as a new compound.

In another aspect the invention is directed to the process of reacting together nickelous halide, magnesium, an organic halide capable of forming a Grignard reagent, and an acetylene containing no acidic hydrogen to form substituted benzenes.

An object of the invention is to provide compounds capable of effecting the condensation of acetylenes to substituted benzenes.

A further object of the invention is to provide polymerizations in which nickel compounds polymerize with di-substituted acetylenes to produce nickel-containing polymers.

The di-valent nickel compounds can be used according to our invention to effect polymerizations of di-substituted acetylenes. The course of the general condensation to aromatic systems can be represented as follows (without balancing the equation):

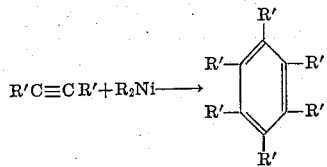

In which both R and R' represent organic radicals and the R's on the acetylene can be the same or different; both R and R' are preferably hydrocarbon radicals.

When a dialkyl nickel compound is employed, there is obtained in addition to the major product of hexa-substituted benzene, a certain amount of tetra-substituted dihydrobenzene, as represented by the following example employing diethyl nickel and diphenylacetylene (tolane):

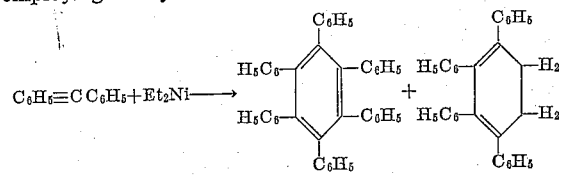

the tetraphenyl dihydrobenzene (1,2,3,4-tetraphenyl-1,3-cyclohexadiene) can be readily dehydrogenated to 1,2,3,4-tetraphenylbenzene.

The polymerization reactions of the present invention are conducted in the presence of tetrahydrofuran. However other relatively highly basic Grignard solvents capable of complexing the divalent nickel compounds to assure a relatively stable form thereof for the reaction would also be suitable.

One especially notable aspect of our invention is the fact that it is possible to react the reagents utilized in preparing the divalent nickel catalyst, including even the magnesium turnings or powder, simultaneously in the same reaction vessel with the di-substituted acetylene compound, and obtain the substituted benzene compounds as products substantially as though the various steps of the reaction were conducted separately. The reactions which are believed to occur in such a procedure can be illustrated by the following equations, utilizing phenyl bromide as an example of an organic compound capable of forming a Grignard reagent, and NiCl$_2$ as an example of a divalent nickel salt.

$$C_6H_5Br + Mg \longrightarrow C_6H_5MgBr$$

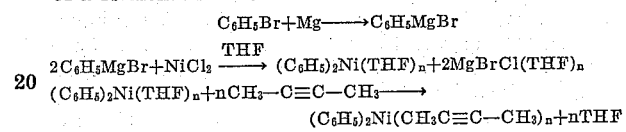

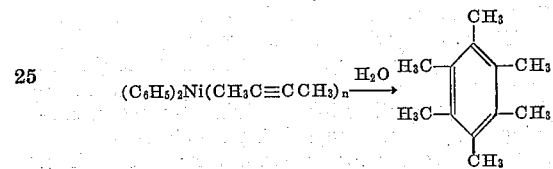

$n = 2, 3, 4$

It will be noted that the use of divalent nickel compounds results in the condensation of disubstituted acetylenes to substituted benzenes, to the substantial exclusion of condensed-ring aromatic systems such as naphthalenes. This is advantageous in having control of the products to be obtained. Moreover, the yield of substituted benzene based on the amount of divalent nickel compound employed is exceptionally good for this type of condensation reaction, being greater than one mole per mole of divalent nickel, thereby demonstrating the catalytic nature of the reaction.

While the controlled condensations to produce 6-membered ring systems are the preferred embodiment of the invention, the polymerization processes of the present invention also include polymerizations which produce true polymers, e.g., high molecular weight polymers containing nickel. The preparation of nickel containing polymers is illustrated:

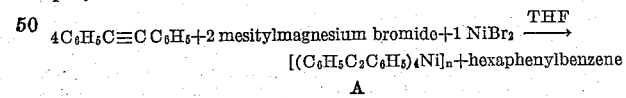

in which $n$ is a positive integer of 1 or 2 to 200 or so. The polymeric material A is insoluble in organic solvents and decomposes at 350° under high vacuum. The polymeric material will be useful in various synthetic resin applications and in semiconductor and lubricant and fuel additive applications.

It will be recognized, of course, that some of our products will be especially suited for some uses, while other of our products will have different uses.

The divalent nickel compounds disclosed and utilized herein can be obtained by reaction of Grignard reagents with nickelous salts in tetrahydrofuran (THF), and the organic portion of the nickel compounds can be any organic radicals capable of forming Grignard reagents. The novel dialkyl and diaryl nickel compounds can be prepared by procedures utilizing the corresponding Grignard reagents as described hereinbelow. It will be realized that effective catalysts can be produced in which the alkyl and aryl radicals are modified by groups which do not prevent the production of Grignard reagents, this being particularly true in the case of inert substituents which do not change the fundamental hydrocarbon character of the radicals. Any aromatic or aliphatic halogen compounds are suitable so long as they do not contain active hydrogen atoms or other groups capable of causing extensive destruction of the Grignard reagents. Suitable organic halogen compounds are set forth in the copending application S.N. 698,376 of Harold H. Zeiss and Walter Herwig. It will be realized that any hydrocarbon radicals, including cycloalkyl radicals, are suitable as the groups attached to nickel, the saturated hydrocarbon radicals being preferred in the case of noncyclic radicals. In the case of aryl radicals, mono-, di-, tri-, or polycyclic radicals are suitable, e.g.; benzenes, naphthalenes, phenanthrenes, anthracenes, etc.; any of the aryl radicals disclosed in the aforesaid copending application S.N. 698,376 are also applicable here. As to the alkyl radicals attached to nickel, those straight or forked-chain alkyl radicals containing about 1 to 20 carbon atoms will ordinarily be employed, particularly those in the range of 1 to 10 or so carbon atoms; for example, methyl, ethyl, n-propyl, isopropyl, n-butyl, iso-butyl, sec-butyl, t-butyl, n-pentyl and each of its isomers, n-hexyl, n-heptyl, n-octyl, 2-ethylhexyl, nonyl, decyl, dodecyl, tridecyl (from Oxo process), octadecyl, eicosyl, etc. As cyclo-alkyl radicals, cyclopentyl, cyclohexyl, etc. can most conveniently be employed. It is also possible to utilize unsaturated cycloaliphatics, e.g., cyclopentadienyl. The straight chain aliphatics can also be unsaturated, vinyl, allyl, etc. groups being suitable.

The novel procedure for preparing the divalent nickel compounds can be represented:

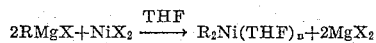

in which R is a monovalent organic radical which becomes attached to nickel, X is a Grignard halogen, THF represents tetrahydrofuran and n is a positive number of say 2 to 10 or more. The solvating tetrahydrofuran stabilizes the nickel compound and permits its use in the ensuing condensation reaction with di-substituted acetylenes. The nickel compound may also be complexed with the magnesium halide.

For an acetylene to condense to an aromatic compound according to the present invention, it is necessary that it be di-substituted. Any alkynes other than 1-alkynes are suitable for such purpose, for example, non-alpha alkynes of 4 to 20 or more carbon atoms, particularly the non-alpha alkynes of 4 to 10 carbon atoms. Suitable alkynes are, for example, those di-substituted acetylenes in which the substituents are any of the straight or forked chain alkyl radicals named hereinabove with respect to suitable alkyl radicals attached to the nickel in the di-valent nickel compound, and, in fact, aryl and cycloalkyl substituents are also suitable, and any of the aryl or cycloalkyl radicals named with respect to the nickel above are also suitable substituents for the acetylenes to be condensed to substituted benzenes. Moreover, acetylenes substituted by heterocyclic substituents are also suitable and produce benzenes containing heterocyclic substituents. As specific examples of non-alpha alkynes and other di-substituted acetylenes suitable for conversion to substituted benzenes, the following can be mentioned: 2-butyne, 2-pentyne, 2-hexyne, 3-hexyne, 2-octyne, 3-octyne, 2,2-dimethyl-3-hexyne, 2-methyl-3-heptyne, 5-decyne, 4-dodecyne, 6-hexadecyne, 2-eicosyne, di-phenylacetylene, α-phenyl-β-methylacetylene, α-phenylmethyl-β-methylacetylene, di-α-naphthylacetylene, 1-anthracyl-propyne, p-tolylethylpropyne, di-p-tolylacetylene, α-xylyl-β-methylacetylene, etc.

In general the reactions described herein, as exemplified by the heterogeneous reaction of dimesitylnickel tetrahydrofuranate with 2-butyne, take place fairly rapidly circa room temperature and are followed by hydrolysis and ether extraction to obtain a crystalline product. It will generally be desirable to cool the reactants below room temperature for the early part of the reaction, perhaps to 0° C., for example, or even to —50° C., or lower, and then permit the reaction mixture to warm up as reaction proceeds, and finally warm the reaction mixture above room temperature to insure completion of the reaction, for example to 50 or 60° C. or higher. Generally the reactants will be employed in a ratio of about 1 to 20 or more moles of di-substituted acetylene per mole of nickel compound, and it will usually be desirable to employ more than 2 moles of such acetylene to assure production of substituted benzenes; above 8 or more moles, there is an increased tendency toward production of the polymeric product. As the halogen in the Grignard reagents and nickelous halides, bromine and chlorine are preferred, but iodine can also be employed, as can fluorine.

In addition to the condensation reactions to produce aromatic systems, it is possible when employing aryl-nickel compounds with di-substituted acetylenes according to the present invention to also have addition reactions to produce styrenes and stilbenes in which the aryl part of the styrenes and stilbenes corresponds to that of the nickel compound; it is possible to direct the process toward these products by employing low amounts of acetylene, for example, amounts much less than equimolar with the nickel compound.

The following examples are illustrative of certain embodiments of the invention.

EXAMPLE 1

To a mixture of 7.12 g. (0.04 mol.) of diphenylacetylene and 1.08 g. (0.005 mole.) of nickelous bromide in 50 ml. of tetrahydrofuran which was placed in a Schlenk's tube once cooled to a temperature of —20° C., 10.1 ml. of mesitylmagnesium bromide (0.92 mol. concentration) were added little by little. The mixture began to turn to a reddish-brown at —13° C. The mixture was stirred for four hours at —10° C. and for two hours at 0° C. The deep reddish-brown reastion mixture was then stirred for two days at room temperature, during which time its color turned to brown-black. Finally, the mixture was warmed at 60° C. for two hours. Then, the solvent was removed from the reaction mixture under reduced pressure. To the residue, 150 ml. of ether was added. The mixture was hydrolyzed with 50 ml. of water. The whole mixture was diluted with 300 ml. of ether and 200 ml. of water. The ether layer was washed with water three times. Flocculent material in the ether layer was separated by filtration. After drying the material, it was extracted with benzene using a Soxhlet extractor. Hexaphenylbenzene, 4.50 g. (1.7 mol.), of M.P. 444–446° C., was obtained and was characterized from analysis, from a mixed melting point and from the identity of spectroscopic data with an authentic sample, M.P. 446° C.

*Analysis.*—Calcd. for $C_{56}H_{40}$: C, 94.34; H, 5.66. Found: C, 94.30; H, 5.84.

From the ether layer above, there was also isolated a 50 mg. quantity of needles, M.P. 155° C.

EXAMPLE 2

A solution of dimesitylnickel was prepared from the reaction of 1.08 g. (0.005 mol.) of nickelous bromide and 10.1 ml. of mesitylmagnesium bromide (0.92 mol. concentration) in 30 ml. of tetrahydrofuran for four hours at a temperature of —10° C. To the reddish-brown solution, 3.56 g. (0.02 mol.) of diphenylacetylene was added at a temperature of —20° C. The mixture was stirred for two hours at 0° C. and for two days at room temperature. Mixture was then treated in a way similar to that of Example 1. Hexaphenylbenzene, 0.50 g., was extracted from the ether insoluble material. A deep orange-colored residue (2.7 g.) was insoluble in organic solvents. A light brown material (1.7 g.) was obtained by the removal of the solvent from the ether extract. This material was sublimed into fractions at 4 mm. pressure. Recrystallization of the second fraction from ethanol gave 20 mg. of needles, M.P. 146–148° C., which solidified to rhombic crystals, M. P. 165–167° C.

*Analysis.*—Found: C, 93.13; H, 6.96.

EXAMPLE 3

The reaction was carried out in a manner similar to Example 2, but the mole ratio of diphenylacetylene to nickelous bromide was 2:1. No hexaphenylbenzene was isolated from the ether insoluble fraction, but 1.52 grams of a deep-orange material were obtained. The infrared spectra of this product were identical to that of the deep-orange material isolated in Example 2.

*Analysis.*—Found: C, 79.27; H, 5.18; Ni, 7.38.

The C:H:Ni ratio is approximately that of a polymeric material formed from diphenylacetylene and nickel in ratio of 4 moles diphenylacetylene per mole of nickel.

EXAMPLE 4

To a mixture of 1.08 g. (0.05 mol.) of nickelous bromide and 7.12 g. (0.15 mol.) of 2-butyne in 50 ml. of tetrahydrofuran, which was cooled at −20° C., 11.0 ml. (0.01 mol.) of mesitylmagnesium bromide (0.92 mol. concentration) was added. The mixture was stirred for four hours at −10° C. and for two hours at 0° C. The mixture was then allowed to stand for two days at room temperature. Since the color of the mixture was still deep reddish-brown, another 17.12 g. of 2-butyne was added to the mixture which was cooled again to −20° C. Then, the mixture was stirred at room temperature. The mixture was warmed at 60° C. for two hours. The solvent was removed under vacuum. To the residue, 150 ml. of ether was added. The mixture was hydrolyzed with ½ N $H_2SO_4$. The mixture was diluted with another 300 ml. of ether and 200 ml. of water. The ether layer was thoroughly washed with water. The combined water fraction was deep brown. The color faded to light brown after standing for two days. The solution was neutralized with ammonia. Addition of N-dimethyl glyoxime solution yielded 1.1 g. of reddish material. The ether layer was filtered to separate the insoluble material, 2.83 g. of a white amorphous material. This material was insoluble in organic solvents and did not melt until a temperature of 350° C. was attained. This material contains nickel and no halogen. The removal of the solvent from the ether extract left 6.40 g. of a light-brown material. Treatment with picric acid gave 1.66 g. of picrate, M.P. 165–170° C. which was isolated from the residue. The mixed melting point of the picrate with an authentic sample of hexamethylbenzene picrate was 166–171° C. The infrared spectra of the picrate were identical to that of hexamethylbenzene picrate.

The yield of hexamethylbenzene was 0.69 g. (0.85 mol.).

The presence of dimesitylnickel in the foregoing examples is confirmed by the production of substituted benzene products, which, as concluded from theoretical considerations and analogous procedures with other metals, provides a positive indication of the presence of dimesitylnickel during the condensation.

EXAMPLE 5

To a suspension of nickelous bromide (8.72 g., 0.04 mol.) and tolane (14.2 g., 0.08 mol.) in 75 ml. of tetrahydrofuran, ethylmagnesium bromide (92 ml., 0.08 mol.) was added dropwise, keeping the temperature of the solution at −60° C. The solution became a deep-reddish color and a reddish material precipitated. The temperature was gradually raised to room temperature over a period of four hours. The reaction mixture was then stirred overnight changing in color to brown-black. The solvent was removed under reduced pressure. To the residue, ether (100 ml.) was added, after hydrolysis by the addition of water (50 ml.). The water layer was further diluted by the addition of 50 ml. of water, and it was extracted three times with 500 ml. of ether each time. The flocculent material in the ether and water was separated by filtration and recrystallized from benzene to give hexaphenylbenzene (1–2.0 g.) with identification by infrared spectrum. Removal of the ether from the deep green ether extract left 12–13 g. of resinous material. The material was extracted with 200 ml. of hot methanol (5–10 times) leaving a deep green material (5–7 g.). The removal of solvent from the combined methanol extracts left a brown material which was recrystallized from ethanol giving white crystals: M.P. 150–165° C. Further recrystallization of these crystals raised the melting point to 170–171° C. U.V. max. 326, 268, and 236 mu.

*Analysis.*—Calcd. for $C_{30}H_{24}$: C, 93.71; H, 6.29; M.W. 384.49. Found: C, 93.87, 94.0; H, 6.07, 5.94; M.W. 363. (Rast method, Camphor.)

The analysis corresponds to 1,2,3,4-tetraphenyl-1,3-cyclohexadiene; the compound will be useful as an organic intermediate, for example to prepare various substituted tetraphenylcyclohexadienes, or to prepare tetraphenylcyclohexane by selective hydrogenation.

The brown resinous material obtained by the removal of the solvent from the mother liquid of the recrystallization was sublimed. A fraction (110–120°/0.2 mm., 1.0 g.) was recrystallized from acetone, giving 0.5 g. of needles, M.P. 115–120°, identified as trans-stilbene by infrared spectrum.

*Characterization of above 1,2,3,4-tetraphenyl 1,3-cyclohexadiene*

A. TREATMENT WITH BROMINE

To the hydrocarbon (0.100 g.) in 20 ml. of glacial acetic acid, 1 g. of bromine-glacial acetic acid solution (10%) was added at room temperature, and the solution was allowed to stand overnight. Dilution of the solution with water gave a precipitate, which was recrystallized from ethanol giving shiny needles, M.P. 188–189° C.

*Analysis.*—Found: C, 94.06; H, 5.99. Calcd. for $C_{30}H_{22}$: C, 94.20; H, 5.80.

The infrared absorption and U.V. spectra were exactly identical to those of 1,2,3,4-tetraphenylbenzene. The mixed melting point with an authentic sample (M.P. 188–190°) was 188–190°.

B. DEHYDROGENATION WITH PALLADIUM-CHARCOAL

The hydrocarbon (0.050 g.) was mixed with the same amount of palladium on charcoal catalyst (10% by weight palladium) and heated at 295° for 2 hours under a nitrogen stream. The reaction mixture was extracted with ether. Removal of the solvent from the ether extract left a residue which was recrystallized from ethanol giving 0.040 g. of shiny needles, M.P. 188–189° which were identified as 1,2,3,4-tetraphenylbenzene (by mixed melting point and I.R.).

C. TREATMENT WITH N-BROMOSUCCINIMIDE

A solution of the hydrocarbon (0.0383 g.), N-bromosuccinimide (0.0178 g.), and a few crystals of dibenzoyl peroxide in 3 ml. of carbon tetrachloride was refluxed for one hour. The crystalline material (M.P. 120–124, succinimide) yielded upon cooling of the solution was removed by filtration. Concentration of the filtrate gave a crystalline material which was crystallized from ethanol, giving 0.030 g. of shiny needles, M.P. 188–189°, identified as 1,2,3,4-tetraphenylbenzene (by I.R. and mixed M.P.).

The greenish material remaining as residue after methanol extraction above was submitted to column chromatography using silica gel (Davison Chemical Co., Baltimore, Maryland, mesh size thru 200). The solvents, petroleum ether (30–60°) and benzene, were mixed in a ratio of 85.15 for elution. The procedure was repeated several times. The eluted green material was dissolved in hot petroleum ether and chilled to induce precipitation, and was then collected by filtration, and recrystallized from ethyl acetate-petroleum and ethyl acetate-ether, to give product of M.P. 270–273° (dec.).

*Analysis.*—Found: C, 84.80; H, 5.14; Ni, 9.87. Calcd. for $C_{42}H_{30}Ni$ (($\phi C\equiv C\phi)_3Ni$); C, 85.09; H, 5.07; Ni, 9.84.

EXAMPLE 6

To a slurry of chromic chloride (3.17 g., 0.02 mol.) in 100 ml. of tetrahydrofuran, ethylmagnesium bromide (55.5 ml., 0.06 mol.) was added dropwise while the temperature of the reaction mixture was maintained at −60°. Instantaneous reaction occurred and the color of the reaction mixture turned to deep reddish-brown. After stirring the mixture for 2 hours at −30°, the mixture was cooled to −40°. Tolane (7.12 g., 0.04 mol.) was then added to the reaction mixture. The mixture was stirred overnight at room temperature. After removal of tetrahydrofuran under reduced pressure, the residue was hydrolyzed and extracted with ether in a way similar to that described in Example 5. Hexaphenylbenzene (0.300 g.) was isolated by filtration of the ether and water layers. The resinous material remaining after the removal of the solvent from the ether extract was sublimed. The fraction from 180–220°/0.7 mm. was recrystallized from ethanol giving 0.1 g. of needles, M.P. 187–189°, which was identified as 1,2,3,4-tetraphenylbenzene (by I.R. and mixed melting point).

As an additional aspect of the invention, it will be realized that the di-substituted acetylene reactants form $\pi$-complex structures with the nickel or nickel salt tetrahydrofuranates, as intermediates in the synthesis of the cyclic, polymeric, or other products, and that such $\pi$-complex structures and their method of preparation contemplated as part of the invention.

We claim:

1. The method of polymerizing di-substituted acetylenes wherein both substituents are monovalent hydrocarbons which comprises contacting and polymerizing same with nickel compounds containing two organic hydrocarbon radicals bonded to nickel.

2. The method of claim 1 in which the product is a 6-membered unsaturated ring compound.

3. The process of preparing benzenes which comprises treating di-substituted acetylenes wherein both substituents are hydrocarbons in tetrahydrofuran with diarylnickel, more than 2 moles of the said acetylenes being employed per mole of diarylnickel.

4. The process of claim 3 in which dimesitylnickel is employed.

5. The process of polymerizing alkynes other than 1-alkynes which comprises contacting same in tetrahydrofuran with at least one mole of diarylnickel per 2 moles of said alkynes.

6. The process of preparing benzenes which comprises contacting alkynes other than 1-alkynes with dialkylnickel in tetrahydrofuran.

7. The process of preparing hexaphenyl benzene and tetraphenyldihydrobenzene which comprises contacting diphenylacetylene with diethylnickel in tetrahydrofuran to effect condensation to hexaphenylbenzene and tetraphenyldihydrobenzene.

8. The method of producing benzenes which comprises contacting a Grignard reagent with nickelous halide and an alkyne other than a 1-alkyne in tetrahydrofuran.

9. The process of claim 8 in which the Grignard reagent is formed in the same reaction from magnesium and an organohalogen compound capable of forming a Grignard reagent with magnesium.

10. The process of producing hexaphenylbenzene which comprises contacting mesitylmagnesium halide, nickelous halide and diphenylacetylene in tetrahydrofuran at temperatures below room temperature and subsequently warming the reaction mixture to temperatures above room temperature.

11. The process of producing hexamethylbenzene which comprises contacting mesitylmagnesium halide, nickelous halide and 2-butyne in tetrahydrofuran at temperatures below room temperature and subsequently warming the reaction mixture to temperatures above room temperature.

12. Di-valent organo nickel compounds solvated with tetrahydrofuran.

13. Dialkylnickel solvated with tetrahydrofuran.

14. Diethylnickel solvated with tetrahydrofuran.

15. Diarylnickel solvated with tetrahydrofuran.

16. Dimesitylnickel solvated with tetrahydrofuran.

17. As a compound, 1,2,3,4-tetraphenyl-1,3-cyclohexadiene.

18. The method of preparing di-covalent organo nickel compounds solvated with tetrahydrofuran which comprises contacting Grignard reagent with nickelous halide in tetrahydrofuran.

19. The method of preparing benzenes which comprises contacting a di-substituted acetylene wherein both substituents are hydrocarbon substituents with the organo nickel compound produced in claim 18.

20. The method of preparing di-covalent hydrocarbon nickel compounds solvated with tetrahydrofuran which comprises contacting hydrocarbon Grignard reagent with nickelous halide in tetrahydrofuran wherein the hydrocarbon radical of the Grignard reagent is selected from the group consisting of: alkyl, aryl, alkaryl, aralkyl, cycloalkyl, alkene, and cycloalkene.

21. The method of preparing benzenes which comprises contacting a di-substituted acetylene wherein both substituents are hydrocarbon substituents with the hydrocarbon nickel compound produced in claim 20.

References Cited in the file of this patent

UNITED STATES PATENTS

| | | |
|---|---|---|
| 2,723,299 | Tanaka et al. | Nov. 8, 1955 |
| 2,846,490 | Witt | Aug. 5, 1958 |
| 2,867,675 | Shapiro | Jan. 6, 1959 |

FOREIGN PATENTS

| | | |
|---|---|---|
| 211,085 | Australia | Oct. 24, 1957 |
| 218,942 | Australia | Nov. 26, 1958 |

OTHER REFERENCES

Schlenk et al.: Chemical Abstracts, Volume 22 (1928), page 4495 relied on.